C. W. HOLLAND.
TOOL FOR REMOVING WHEELS FROM THEIR AXLES.
APPLICATION FILED MAY 31, 1919.

1,345,186.  Patented June 29, 1920.

Witness
R. O. Thomas

Inventor
Charles W. Holland

By Victor J. Evans
Attorney

UNITED STATES PATENT OFFICE.

CHARLES W. HOLLAND, OF ALTOONA, PENNSYLVANIA.

TOOL FOR REMOVING WHEELS FROM THEIR AXLES.

1,345,186. Specification of Letters Patent. Patented June 29, 1920.

Application filed May 31, 1919. Serial No. 301,009.

*To all whom it may concern:*

Be it known that I, CHARLES W. HOLLAND, a citizen of the United States, residing at Altoona, in the county of Blair and State of Pennsylvania, have invented new and useful Improvements in Tools for Removing Wheels from Their Axles, of which the following is a specification.

This invention relates to a tool for exerting great pressure and has for its primary object to provide a device of this character capable of effectively moving a wheel from its axle and which may also be used in other relations such as bending metallic bars or similar objects.

An object of the invention is to provide a simple tool capable of being effectively associated with an object on which pressure is to be exerted.

Besides the above my invention is distinguished in the manner of forming the end of the screw so that the same can be properly centered upon the end of an axle.

With these and other objects in view the invention will be better understood from the following detailed description taken in connection with the accompanying drawing wherein.

Figure 1:
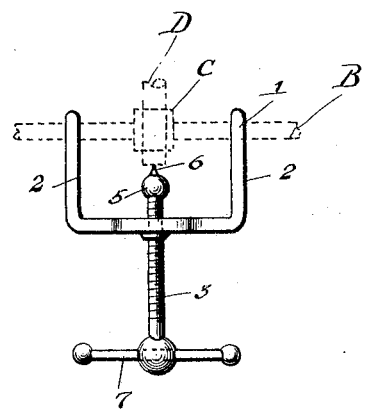
Figure 1 is a top plan view of the tool.
Figure 2:
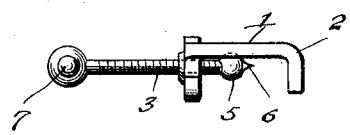
Fig. 2 is a side elevation.
Figure 3:
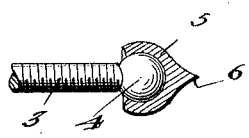
Fig. 3 is a detailed sectional view through the cap.

Again referring to the drawing illustrating one of the many forms in which my invention may be constructed, the numeral 1 designates a clamping member provided with laterally extending clamping limbs 2 which may be of any required shape or size so as to grip around an object such as the spokes B of a wheel C mounted on an axle D. Threaded into the clamping member is a screw 3, one end of which is formed into a ball 4 which is loosely mounted on a cap 5. This cap 5 is provided with a point 6 whereby the end of the screw may be properly centered in the axle D so as to insure the proper association of the device with the wheel.

The other end of the rod 3 has slidably mounted therein a handle 7 by means of which the screw 3 may be turned to create great pressure. It is of course to be understood that the exact shape of the clamping member and its association with the adjustable element may be varied at will depending upon the effect to be obtained and therefore I do not desire to be limited in any manner except as set forth in the claims hereunto appended.

Having described my invention, what I claim is:

In a tool of the character described, a clamping member, a screw threaded through said member and provided on its inner end with a ball, and a cap member loosely receiving the ball so as to permit independent rotation thereof, the cap member being movable about the ball and provided with a centering point.

In testimony whereof I affix my signature.

CHARLES W. HOLLAND.